United States Patent [19]
Kopacki et al.

[11] 3,720,734
[45] March 13, 1973

[54] PVC COMPOSITIONS CONTAINING CARBOXYLIC ACID ANHYDRIDE COPOLYMERS

[75] Inventors: Adam F. Kopacki, Westwood, N.J.; John H. Deatcher, Lake Peekskill, N.Y.

[73] Assignee: Stauffer Chemical Company, New York, N.Y.

[22] Filed: April 15, 1971

[21] Appl. No.: 134,488

Related U.S. Application Data

[63] Continuation of Ser. No. 799,907, Feb. 17, 1969, abandoned.

[52] U.S. Cl. ............260/899, 260/23.5, 260/45.75, 260/45.85
[51] Int. Cl. ................................................C08f 29/24
[58] Field of Search........................................260/899

[56] References Cited

UNITED STATES PATENTS

| | | | |
|---|---|---|---|
| 2,470,911 | 5/1949 | Baer | 260/78.5 |
| 2,483,959 | 10/1949 | Baer | 260/45.75 |
| 2,047,398 | 7/1936 | Voss et al. | 260/2 |
| 3,632,839 | 1/1972 | Young et al. | 260/898 |

*Primary Examiner*—Samuel H. Blech
*Assistant Examiner*—C. J. Seccuro
*Attorney*—Robert C. Sullivan et al.

[57] ABSTRACT

A polymeric composition consisting essentially of a solid polymer selected from vinyl chloride homopolymers having increased impact strength by adding thereto a responsive amount of copolymers of unsaturated carboxylic acid anhydrides.

9 Claims, No Drawings

PVC COMPOSITIONS CONTAINING CARBOXYLIC ACID ANHYDRIDE COPOLYMERS

This application is a continuation of application Ser. No. 799,907, filed Feb. 17, 1969, now abandoned

BACKGROUND OF THE INVENTION

A common and widely used synthetic thermoplastic resin of low cost is polyvinyl chloride. It is a white powder or colorless granules or pearls which can be converted by heat and pressure into various shapes. They are tasteless, odorless, resistant to action of chemicals including moisture and air, flame retarding and self-extinguishing to a greater degree than other low cost plastics, dimensionally stable and with good electrical properties. They do not absorb or dissolve either water or oil, insoluble in water and in most organic solvents.

The properties vary widely with the method of polymerization. The polyvinyl chloride homopolymers are usually manufactured by suspension or bead polymerization. In this system, the monomer that contains a suitable catalyst dissolved therein is added to an aqueous medium. The monomer is suspended in the medium in the form of globules which are prevented from recombining by vigorous agitation in the presence of a colloidal suspension stabilizer. The polymerization products formed by this technique are granular in form. This and other polymerization methods, such as emulsion, solvent, and bulk, are all well documented and understood in the art.

While this product has enjoyed high commercial success, it was long ago recognized that the product slowly decomposed by the liberation of hydrogen chloride gas. Thus, small amounts of stabilizers in the form of lead, zinc, barium, calcium, tin compounds, epoxy compounds, were added during manufacture to prevent the slow degradation process. Many other additives have been proposed for addition to the polyvinyl chloride homopolymer to improve light stability, heat stability antioxidant properties and the like. Other additives have been proposed to improve the impact strength of the end product. Moreover, large amounts are required to show any improvement which greatly increases the cost in addition to masking the physical characteristics. However, none of these additives taken singly or in combination with each other have been notably successful for considerably improving the impact strength of the end product.

BRIEF DESCRIPTION OF THE INVENTION

It has been discovered that small amounts of copolymers of unsaturated carboxylic acid anhydrides can be admixed with the polyvinyl chloride homopolymer granules that are manufactured in a conventional manner to provide considerable improvement in the impact strength of the end product. The additives of the present invention can be used alone or in combination with commercial stabilizers.

DETAILED DESCRIPTION OF THE INVENTION

A suitable reaction vessel equipped with a heating system and an agitating system is charged with water and then heated to a predetermined temperature. The vinyl chloride monomer along with a suspension agent is charged to the water. Thereafter, a predetermined amount of a catalyst is charged to the reaction vessel. The catalyst can be selected from any number of conventionally used catalysts that are well known and understood in the art. The catalyst can be charged alone or in a carrier solution. The total suspension medium is then heated until the vinyl chloride monomer has completed polymerization. The charging order of the components do not necessarily have to be made in the order stated. The polyvinyl chloride polymerized product is in the form of small beads and can be readily handled.

The polyvinyl chloride homopolymer granules are then conveyed to a conventional blending apparatus wherein a copolymer of unsaturated carboxylic acid anhydride is dispersed therein. It should be pointed out that it is essential that the anhydride copolymer be completely dispersed within the polyvinyl chloride homopolymer granules. The amount of anhydride copolymer added can be at least 0.1 parts by weight of the polyvinyl chloride homopolymer present. It is preferred to use up to about 5 parts by weight. The formulation can then be worked in any conventional manner such as by milling, extruding or the like. As a specific embodiment, the formulation can be milled up to about 15 minutes at a temperature ranging between 300° and 400°F and then pressed into sheets at a temperature of up to about 450°F.

The carboxylic acid anhydrides must be unsaturated. Thus, the carboxylic acid anhydrides can be selected from the group consisting of citraconic anhydride, aconitic anhydride, itaconic anhydride, maleic anhydride and any mixtures thereof. It is required that the carboxylic acid anhydrides be polymerized with a second component to form copolymers. The second component can be selected from the group consisting of ethers, particularly alkyl vinyl ethers, wherein the alkyl radical contains between one and 25 carbon atoms, either straight chained or branched chained, styrene and olefins. Thus, the unsaturated carboxylic acid anhydride copolymers of the present invention can be selected from a group consisting of methyl vinyl ether/maleic anhydride copolymers, isobutyl vinyl ether/maleic anhydride copolymers, octadecyl vinyl ether/maleic anhydride copolymers, styrene/maleic anhydride copolymers, methyl vinyl ether/citraconic anhydride copolymers, isobutyl vinyl ether/citraconic anhydride copolymers, octadecyl vinyl ether/citraconic anhydride copolymers, styrene/citraconic anhydride copolymers, methyl vinyl ether/aconitic anhydride copolymers, isobutyl vinyl ether/aconitic anhydride copolymers, octadecyl vinyl ether/aconitic anhydride copolymers, styrene/aconitic anhydride copolymers, methyl vinyl ether/itaconic anhydride copolymers, isobutyl vinyl ether/itaconic copolymers, octadecyl vinyl ether/itaconic copolymers, styrene/itaconic anhydride copolymers, or any mixtures thereof. If desired, conventional stabilizers, antioxidants or the like can be blended therewith.

In order to illustrate the merits of the present invention, the following examples are provided:

EXAMPLES 1 – 5

A polyvinyl chloride homopolymer was obtained in the form of granules and blended into several different formulations. The formulations were milled for 5 minutes at 355° to 360°F and pressed at 355°F. Specimens were then cut for physical testings. The formulation of five different samples were tested for tensile impact strength which is expressed in pounds per square inch. The results of these tests are tabulated in Table I.

TABLE I

|  |  | Tensile Impact Strength Pounds per square inch (ASTM D 1822 61T) |
|---|---|---|
| Example 1 (Control) | | |
| PVC homopolymer Mark - WS * | 100 parts by weight | 72 |
| Lubricant (Stearic acid) | 2 " 0.5 " | |
| Example 2 | | |
| PVC homopolymer Mark - WS * | 100 parts by weight | 211 |
| Methyl vinyl ether/ maleic anhydride copolymer | 2 " 0.5 " | |
| Example 3 | | |
| PVC homopolymer Mark - WS * | 100 parts by weight | 177 " |
| Styrene/maleic anhydride copolymer | 2 " 0.5 " | |
| Example 4 | | |
| PVC homopolymer Mark - WS * | 100 parts by weight | 125 |
| isobutyl vinyl ether/ maleic anhydride copolymer | 2 " 0.5 " | |
| Example 5 | | |
| PVC homopolymer Mark - WS * | 100 parts by weight | 135 |
| octadecyl vinyl ether/ maleic anhydride copolymer | 2 " 0.5 " | |

* —Mark WS is a registered trademark of Argus Chemical Corporation for a barium/cadmium organic soap for the stabilization of rigid and plasticized polyvinyl chloride As can be readily seen from the above data, there is a significant increase in tensile impact strength using the carboxylic acid anhydride copolymers of this invention as compared to the control formulation of Example 1. The additives of the present invention can also be blended with copolymers or other polymeric compositions.

What is claimed is:

1. A solid polymeric composition characterized by an improvement in the impact strength of the end product comprising a vinyl chloride homopolymer and a copolymer of an alkyl vinyl ether and an unsaturated carboxylic acid anhydride selected from the group consisting of maleic, citraconic, aconitic, and itaconic, the copolymer being present in the amount of between at least 0.1 percent and about 5.0 percent, by weight, of said vinyl chloride homopolymer.

2. The composition according to claim 1 wherein the alkyl radical of the vinyl ether component can have from one to 25 carbon atoms.

3. The composition according to claim 1 wherein the alkyl radical of the vinyl ether component can be selected from a group consisting of methyl, isobutyl, and octadecyl.

4. The solid polymeric composition as recited in claim 1 wherein said unsaturated carboxylic acid anhydride is maleic anhydride.

5. A method for improving the impact strength of a solid polyvinyl chloride thermoplastic article comprising admixing from about 0.1 percent to about 5 percent by weight, based on the weight of the polyvinyl chloride, of an impact modifier to said polyvinyl chloride prior to forming the said polyvinyl chloride into said solid article, said impact modifier being a copolymer of alkyl vinyl ether and an unsaturated carboxylic acid anhydride selected from the group consisting of maleic, citraconic, aconitic, itaconic, and mixtures thereof.

6. The method as recited in claim 5 wherein said unsaturated carboxylic acid anhydride is maleic anhydride.

7. The method as recited in claim 5 wherein a barium cadmium organic soap heat stabilizer is also added during said admixing.

8. The method as recited in claim 5 wherein the alkyl radical of the vinyl ether component can have from one to 25 carbon atoms.

9. The method as recited in claim 8 wherein the alkyl radical of the vinyl ether component can be selected from the group consisting of methyl, isobutyl, and octadecyl.

* * * * *